Figure 1:
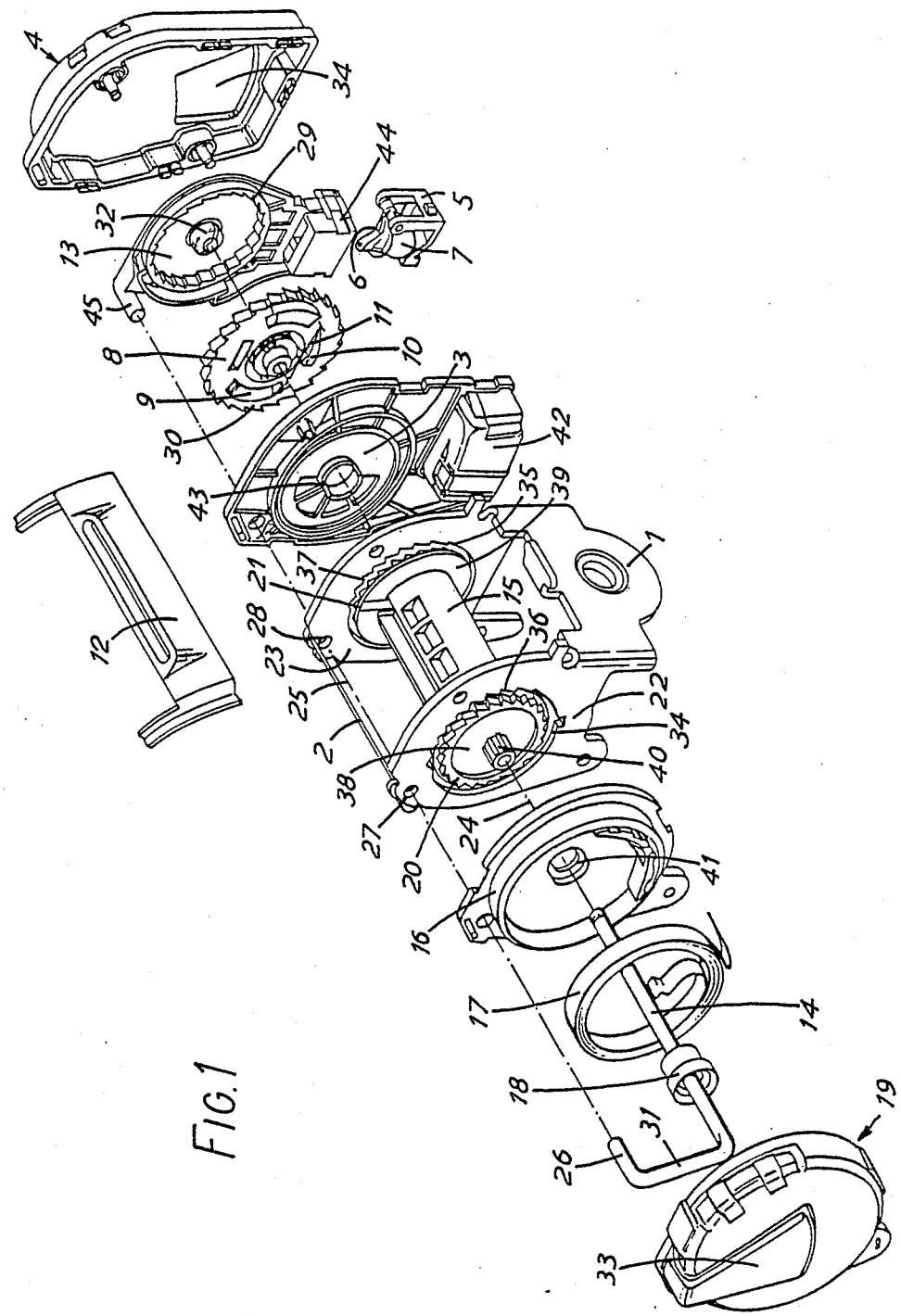

United States Patent [19]

Meyer et al.

[11] Patent Number: 4,796,918

[45] Date of Patent: Jan. 10, 1989

[54] AUTOMATIC REWINDING TYPE SAFETY BELT RETRACTORS

[75] Inventors: Rudolph Meyer, Odelzhausen; Martin Specht, Munich, both of Fed. Rep. of Germany

[73] Assignee: BSRD Limited, Carlisle, Cumbria, United Kingdom

[21] Appl. No.: 177,723

[22] Filed: Apr. 5, 1988

[30] Foreign Application Priority Data

Apr. 6, 1987 [DE] Fed. Rep. of Germany ....... 3711537

[51] Int. Cl.[4] .................. B60R 22/36; B60R 22/40; B60R 22/38
[52] U.S. Cl. .......................... 280/806; 242/107.4 A; 280/807
[58] Field of Search ................ 280/806, 807; 242/107.4 A

[56] References Cited

U.S. PATENT DOCUMENTS

| 4,431,145 | 2/1984 | Kassai | 280/806 |
| 4,470,557 | 9/1984 | Ernst | 242/107.4 A |
| 4,603,819 | 8/1986 | Loose et al. | 280/806 |
| 4,667,894 | 5/1987 | Izuchi et al. | 242/107.4 A |
| 4,691,875 | 9/1987 | Higbee | 280/806 |

Primary Examiner—Kenneth R. Rice
Attorney, Agent, or Firm—Markell Seitzman; Russel C. Wells

[57] ABSTRACT

In an automatic spring biassed seat belt retract for passenger seat belts in vehicle a winding reel (15) has a coil spring (17) which winds up as the belt webbing is pulled off the reel, the reel is mounted in a frame (1) with interval teeth (30,31) in apertures (34,35) on each side (22,23) of the frame and the reel assembly is rigidly rockable about a pivot axis (26–45) displaced from the reel periphery to achieve programmed synchronized meshing of teeth (20,21) of the reel with the teeth of the apertures to lock up the reel when excessive vehicle deceleration or excessive webbing pull-out acceleration is sensed by inertia sensing means and such synchronized movement being assured by the manner of the reel mounting on a U-shaped needle arrangement (14,26,31) in the frame.

9 Claims, 5 Drawing Sheets

AUTOMATIC REWINDING TYPE SAFETY BELT RETRACTORS

The invention relates to an automatic rewinding type safety belt retractor for a passenger safety belt. An automatic rewinding type safety belt has been disclosed in the DE-OS No. 34 18 378. A frame which can be fixed to a vehicle typically has two parallel frame pieces with teeth which can be engaged by two teeth at the two ends of a winding reel for a safety belt, which can be wound on or off so that the winding reel can be mechanically locked. The mechanical locking is triggered by an inertia sensor system in the mechanism which responds selectively to excessive vehicle deceleration (CS-sensor) or to excessively accelerated belt movements (WS sensor). In such automatic rewinding type safety belt retractors there is provided on a mechanism base plate connected to one frame piece, a bearing journal to act as pivot for a plate or disc cam. After locking by either the vehicle sensitive sensor or the belt sensitive sensor the cam plate together with a control wheel guided in it are pivotted around the pivot formed by the short bearing neck or journal. On being pivotted the plate cam carries with it around this pivot a peg or cog provided at the mechanism side (end) of the winding reel so that the teeth provided at the end of the winding reel near the mechanism engage in teeth of the frame.

On the other end a bearing of the winding reel is guided in an elongated hole so that on locking pivotting occurs there also, the teeth provided at that end of the winding reel also engage teeth in the frame. In view of the fact that the bearing journal at the mechanism end is only piovtted at that end for moving the winding shaft from its operative to its locked setting it may not be possible to achieve an absolutely precise or synchronised meshing for locking teeth on both sides. Moreover, imprecise meshing can be made worse by the fact that meshing takes place by virtue of a rocking motion which results in meshing of the locking teeth is successive rather than simultaneous.

According to the present invention there is provided an automatic safety belt webbing retractor mechanism having a webbing reel (15) rotatable around a reel axle (14) for winding and unwinding a safety belt and biassed by a spring (17) said webbing reel being rotatably moveably in a frame having two parallel side parts (22,23), locking teeth peripheries (20,21) provided at both ends of the webbing reel, said teeth being cooperable with teeth (36,37) disposed on the frame parts, an inertia device sensitive to exceeded vehicle deceleration or vehicle acceleration and/or accelerated belt movements for mechanical locking of the webbing reel (15) said webbing reel being supported so as to be able to make rocking movement between an operation position in which said webbing reel is freely rotatable and a locking position in which the teeth are engaged said inertia device comprising a toothed wheel (8) mechanically rotatable with the reel (15) and carried by a member (13) which carries on end of the reel axis pawl means (6 or 10) acting between said wheel (8) said member (13), said member being rockable about a pivot under the effect of belt tension when such pawl means (6,10) are engaged to effect engagement of the teeth (20,21,36,37) for locking the reel characterised in that the distance of the axis of the pivot 45 of the member (13) from the axis of the reel is greater than the radius of the toothed peripheries of the reel and that means (14,26,31) are provided operable to synchronise engagement of the locking teeth (20,21;36,32) on each side of the reel (15).

The invention will now be described in greater detail with reference to the accompanying drawings of which:

FIG. 1 a perspective exploded view of the various components, from which one embodiment of the automatic rewinding type safety belt retractor is made up.

Figure 2:
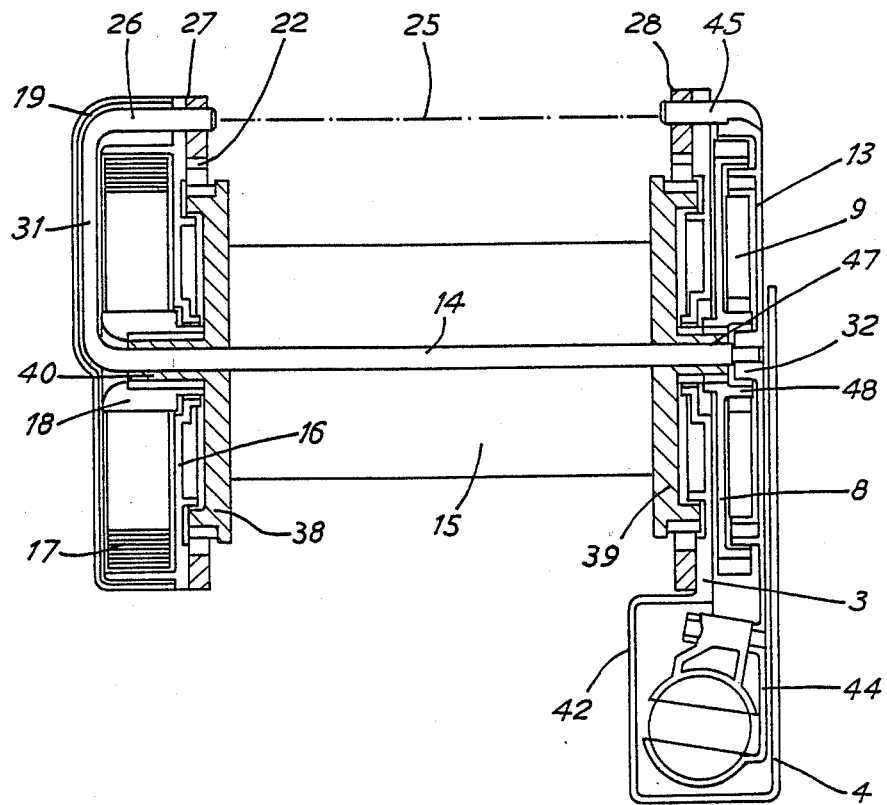

FIG. 2 shows the the full assembled automatic rewinding type safety belt retractor the individual parts of which are shown in FIG. 1. FIGS. 3-8 Further forms of embodiments and details of the invention.

The automatic rewinding type safety belt retractor shown in FIGS. 1 and 2 comprises a frame or bracket 1 to be anchored or fixed to a vehicle. This frame 1 has two side frame pieces 22 and 23 extending parallel to one another. Both side frame pieces 22 and 23 have substantially circular holes 34, 35 on parts of the circumferences of which are teeth 36 and 37. In frame 1 is the winding reel 15 around which can be wound a safety belt, now shown. The winding reel 15 has circular disks 38, 39 at its two ends. In the case of the embodiment shown these discs 38, 39 have teeth 20, 21 extending around their entire circumferences. These teeth 20, 21 are complimentary to teeth 36 and 37 on the internal circumference of the apertures 34 and 35 in the two frame pieces 22, 23. The two-circular end discs 38, 39 rest with their teeth 20, 21 in the apertures 34, 35 in the frame pieces 22, 23. The frame 1 is stiffendend by a distance piece 2. A conventional design belt guide 12 is provided for facilitating the guiding of a safety belt (not shown).

On the spring side (to the left of frame 1 shown in FIG. 1) is a pretensioned retraction spring 17 which engages in a spigot (pinion 40 at one end of the reel 15. The spring 17 is designed in the form of a coil spring and its outer end is held by a spring cup 16. The inner end of the coil spring engages in the aforesaid pinion 40 of the winding reel. A spring core 18 acts as connection between the pinion or spline 40 and the inner end of the coil spring 17. The retraction means for the safety belt containing the retraction spring 17 is enclosed by a cup shape cover 19 which acts also as part of the retractor housing on the side where the spring is located. The spring cup 16 and the housing part 19 are made from plastic mouldings. In the as-fitted state the spring cup 16 is placed directly on the side face of the frame piece 22, with the pinion 40 projecting through a hole 41 in the bottom of the spring cup 16 and the inner end of the coil spring 17 engages the pinion or spline 40 by means of the spring core 18.

On the right hand side in FIGS. 1 and 2, a mechanism base plate 3 is placed directly on the outer face of the frame piece 23. At its lower end the mechanism base plate 3 has a housing part 42 which accommodates the deceleration sensor system 5, 6, 7. A pinion or spline (not shown) projects from the end disc 39 into a hole 43 in the base plate for the mechanism. On this (not shown) pinion engages a ratchet wheel 8, also thus rotationally connected to the winding reel 15. The ratchet wheel 8 has a hollow cylindrical axle stub on which is rotably supported a rotary the inertia plate 9. On the rotary inertia plate 9 is a leaf spring 11 which biases in known manner a ratchet pawl 10 mounted on the rathet wheel 8 out or engagement with internal rathet teeth 29 or a multifunction part 13. The multifunction part 13 has at its bottom end means for accommodating the vehicle deceleration sensitive sensor mechanism 5, 6, 7. The multifunction part 13 is substantially cap-shaped and has at its centre a bearing location 32 for a bearing needle 14. The end of the bearing needle 14 on the mechanism side is held in this bearing location 32. The bearing needle 14 thus extends through all the parts to the bearing location 32 on the multifunction part 13.

The end of the bearing needle where the spring is located is in a U-shape with the bridge of the U-shape needle part forming a rocking lever 31 whilest the free limb 26 forms in conjunction with a support peg 45 on the multifunction part 13 a rocking axis 25 for the bearing needle 14 which passes through the functional parts of the retractor. The free limb at the end of the bearing needle on the spring-side is inserted so as to be free to swivel in a hole forming a bearing location 27 in the frame piece 22. The bearing peg 45 on the multifunction part 3 passes likewise through a hole in the mechanism base plate 3 and is inserted so as to be free to swivel in a bearing location 28 in the frame piece 23. The apertures of the bearing locations 27 and 28 are in line with one another and the thereby formed rocking axis 25 extends parallel to the axis of the bearing needle 14 which passes through the winding reel 15. An off-centre or asymmetrical support of the winding reel is thus obtained. The bearing locations 27 and 28 in which are inserted the free limb 26 and the bearing peg 45 are bearing locations and their distance from one another is approximately the same as the axial extend (length) of the winding reel 15. On movement of winding reel 15 from its rest or operation position into the locking setting the reel 15 is hence perfectly supported over its entire axial length by frame pieces 22, 23 so there is attained an exact synchronous movement of the two end plates 38 and 29 which carry teeth 20 and 21.

The mode of operation of the shown example of embodiment for the automatic rewinding type safety belt will be explained in greater detail in the following.

In the rest setting, or the normal operating setting shown the winding reel 15 with its two end discs 38 and 39 is positioned in the middle of the apertures 34 and 35 of the two frame pieces 22 and 23. The support for the winding shaft of the side near the spring 17 is obtained through the bridge acting as rocking lever 31 for the bearing needle 14 and through the free limb 26, which is inserted in the bearing location 27. At the other end support of the reel is effected by the bearing peg 45 which is an integral part of the multifunction part 13 and is inserted into the bearing location 28 in the frame piece 23 and through a multifunction part 13 and the bearing location 32 carrying end of the bearing needle 14.

The winding shaft 15 is held resiliently in this setting with the spring force being provided by a spring tab 46 forming a return or restoring spring tab at 46 moulded onto the multifunction part 13 and which spring 46 supports the multifunction part and thereby the bearing pin 14 resiliently relative to the frame 1. The spring tab 46 can either be reacted directly on frame 1 or on the mechanism base plate 3 in a sense to tend to keep teeth 20, 21 clear of teeth 36, 37.

The inertia sensor system made up of parts 5 to 11 comprises the vehicle deceleration sensitive sensor (5, 6, 7) mechanism and a belt movement sensitive mechanism 9, 10, 11 which can be actuated separately and independently from one another.

When a vehicle is excessively accelerated or braked the vehicle sensitive mechanism 5, 6, 7 will react and a ratchet 6 of this sensor mechanism will engage a tooth 30 of a ratchet wheel or disc 8. This will result in the locking of the winding reel 15 in unwinding direction so that pull of the belt in unwinding direction will not allow the belt to be unwound further and the winding reel 15 is brought, by rocking 13 and 31 around the swivel axis 25 from the rest setting to its locked setting in which the teeth 20 and 21 on the two end discs 38 and 39 of the winding shaft 15 engage teeth 36 and 37 in the two frame pieces 22 and 23. The entire pull acting on the belt is then reacted by the frame 1. By reason of the feature that the ratchet disc or wheel 8 is rotationally connected to the journal on the side of the winding reel 15 near the mechanism, the sensor reaction generated by the vehicle sensitive sensor system 5, 6, 7 resulting from the engagement of the detent or catch 6 into a tooth 30 of the ratched disc or wheel 8 is directly utilized for initiating the rocking movement of the winding reel 15 into the locking setting.

When the belt is pulled from the winding reel 15 with excessive acceleration, due to the inertia of the inertia plate 9 there is relative motion between the ratchet wheel 8 and the inertia disc 9 against the force of leaf spring 11. When the spring force threshold leaf spring 11 is overcome the ratchet 10 swivels from its rest setting in FIG. 1 into a locking setting in which the ratchet 10 engages in the teeth 29 provided on the multifunction part 13. In the event of continued pulling exerted on the winding reel 15 through the belt this too prevents further turning of the winding reel 15 and at the same time the rocking of the winding reel 15 from the rest setting into the locked setting is initiated. In this case also winding reel 15 swivels around the swivel axle 25. The pulling force introduced through the belt is again fully taken up by the frame 1.

The asymmetrical or out-of centre support of the winding reel 15 in the bearing locations 27 and 28 of the frame pieces 22 and 23 causes a synchronous guiding engagement of the teeth 20 and 21 on the two end discs 38 and 39 of the winding reel 15 into the teeth 36 and 37 respectively in the frame pieces 22 and 23. By reason of the restoring effect of the spring tab 46, of the multifunction part 13 it is possible for the winding reel 15 to be returned to its starting position. The same applies to the ratchet 10 of belt sensitive sensor mechanism by virtue of its leaf spring which exercises a restoring effect so that ratchet disc or wheel 8 and the inertia wheel 9 return to rest settings relative to one another. The engagement of the vehicle sensitive sensor mechanisms 5 to 7 with the ratchet wheel 8 is thus also released during the restoring or return movement.

Figure 3:
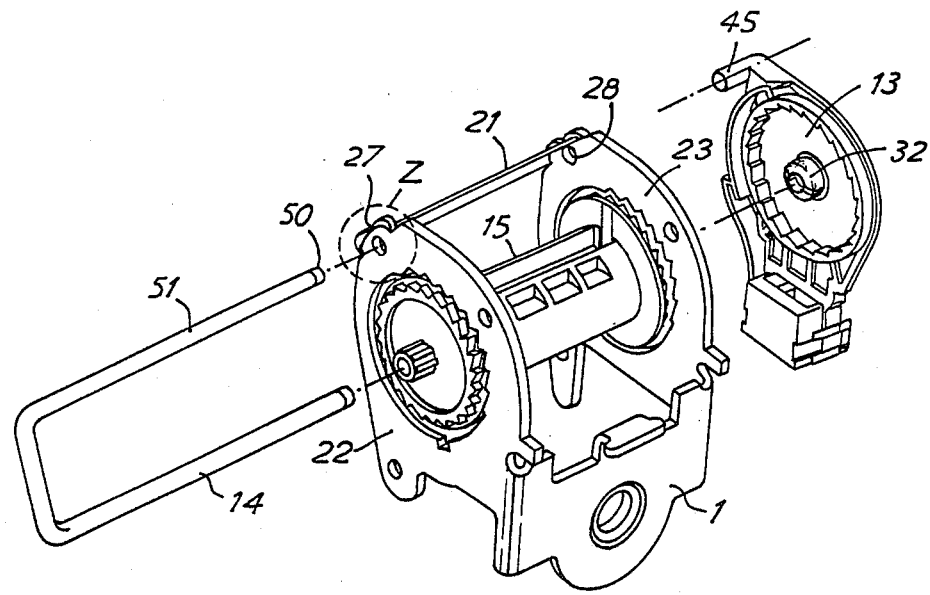

So that swivel arm 31 of the bearing needle 14 and the vehicle sensitive sensor mechanism 5 to 7 participating in the rocking motion of the multifunction part 13, have sufficient freedom of motion the housing shells 4 and 19 have appropriate recesses 34 and 33 in their walls. In the embodiment as shown in FIG. 3 a bearing needle 51, 14 is altogether U-shaped. One limb 51 of the U-shaped bearing needle extends through the two bearing locations 27 and 28 in the two frame pieces 27 and 23 and defines the rocking axis for the winding shaft 15. On the mechanism side one end 50 of the needle limb 51 is located in 45 and held rotationally direction and preferably also in axially. The end of the limb 14 of the needle bearing forming the axis for the winding reel 15 is supported as before in the bearing location 32 of the multifunction part 13. The U-shape bearing needle 14 with the needle limb 51 form in conjunction with the multifunction part 13 a frame which can be rocked around a swivel axis formed by the needle limb 51. The outer limb part forms the bearing axle for the functional parts of the automatic rewinding type safety belt shown before in detail in FIG. 1.

Figure 8:
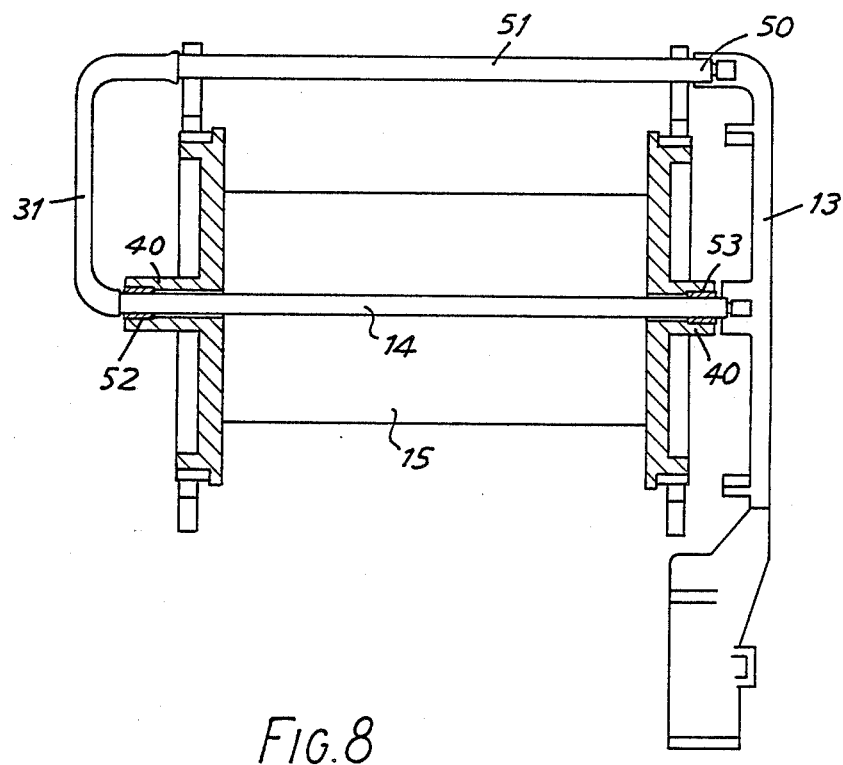

As can be seen in particular from FIG. 8 the end 50 of the needle limb 51 is accommodated by the peg 45 of the multifunction part 13 and by virtue of the shape of the end 50 it is located in this against radial and axial movement.

As shown in FIG. 8, the winding reel 15 may also be supported at its end, i.e., specifically in the regions of pegs 40 at its end face, at two bearing locations 52, 53 comprising brushes which are freely rotatable on the bearing needle 14. The bearing diameters can be reduced to a minimum of (say) 3 mm. The hysteresis resulting from bearing friction may thereby be reduced substantially compared with prior art arrangements. Very smooth running of the winding reel 15 can be achieved both on taking up and unreeling of the belt.

As a result of the low hysteresis it is also possible to reduce the restoring force of the restoring spring 17 so that the width of this spring can be reduced. This feature is instrumental in permitting compactness of the entire arrangement.

This compact packaging is furthermore helped by the disposition of the vehicle sensitive sensor and belt sensitive sensor inside the multifunction part, such as is shown specifically in FIG. 2.

If the examples of the embodiments of FIGS. 3 and 8 are adopted on the spring and mechanism sides, virtually the same functional assemblies as are shown for example of embodiment per FIGS. 1 and 2 can still be used.

Figures 4, 5:
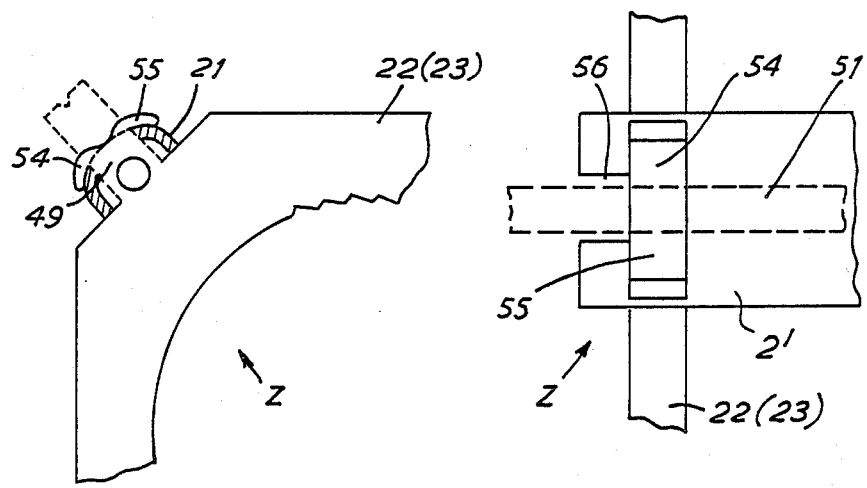

In the embodiment shown in FIG. 3 the spacer 2' for the two frame pieces 22 and 23 can be designed as U-shape so that it shields the outside of the needle limb 51 as shown in FIG. 4. FIGS. 4 and 5 shown in enlarged scale the detail down in FIG. 3 They show the fastening of the one end of the spacer 2' so that this spacer is held in shape and in radial direction on the frame piece 22. As shown in FIG. 5 the strap 49 extends through a hole 56 at the end of the spacer 2' and the spacer 2' is thus retained in axial direction in the region of hole 56 on the strap 49. The same arrangement is provided at the other end of the spacer 2' in connection with the frame pieces 23.

Figure 6:
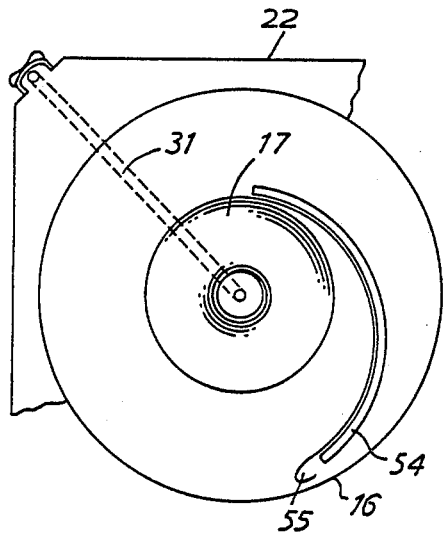
Figure 7:
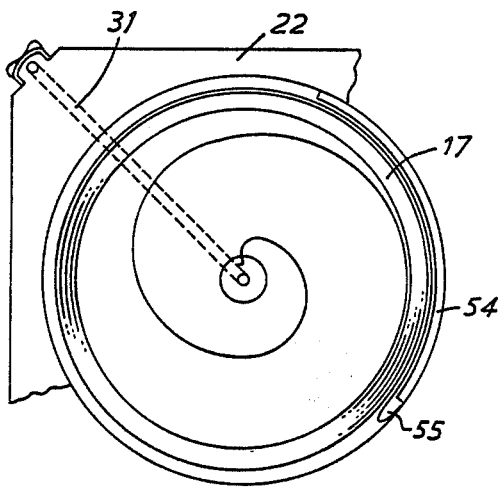

FIGS. 6 and 7 show an embodiment of the restoring spring 17. FIG. 6 shows the spring in its operating setting which it takes on when the belt is in use and is nearly fully pulled out from the retractor. When on pulling out of the belt there remains only a small remainder of the belt on the winding shaft and by further pulling the belt is being further pulled out there arises the danger that the winding shaft 15 is rocked in direction towards its locked setting so that the teeth on the two end discs 38 and 39 enter englancing contact with the two toothings 36 and 37 in the frame pieces 36 and 37 and the result is a wearing and scraping noise. In order to counteract this undesirable motion of the winding shaft 15 out of its normal operating setting into its locked setting the restoring or return spring is designed so that on pulling out (unwinding) of the belt up to the belt end it exercises an enhanced restoring force upon the bearing needle 14 and thereby upon the winding shaft 15. In the case of the shown example of embodiment this enhanced restoring force exercised by the restoring spring 17 is typically achieved by increasing the stiffness of this spring typically by an additionally thickening 54 of the end portion of the spring which is connected to the inner circumference of the spring cup 16. The increasing restoring force brought about by the thickening 54 has the effect that the spring core pulled together (contracted-on pulling out of the belt is forced away from the blocking setting so that the teeth 20 and 21 of end discs 38 and 39 and the teeth 36 and 37 of the frame pieces 22 and 23 do not come in contact. FIG. 7 shows the spring 17 in its starting setting in which the belt is fully wound around the winding shaft 15. The end of the restoring spring 17 is fixed to a point 55 on the inner circumference of the spring cup 16. The desired restoring force in the operating setting when the belt is pulled out can be obtained by the position of this fastening point 55 and the length of the spring portion 54 supplying or providing the increased restoring force. The spring portion 54 with enhanced restoring force can be achieved by appropriate thickening of the restoring spring 17 or by an additionally inserted piece of spring in the zone of the end piece which is fixed at the fixing point 55 to the inner circumference of the spring cup 16.

Reverting briefly to the vehicle deceleration system it will be seen that this comprises a pawl 6 with a cup-shaped surface which sets in the manner of a cap on a relatively heavy steel ball 7. The pawl 6 thereby lifts and comes into direct engagement with the teeth 30 of wheel 8 if the ball is displaced by excessive deceleration. The ball 7 and its carrying part 5 are then carried with the resultant rocking movement of 13 about 45 which locks the reel 15.

Although a spring tab 46 is incorporated to provide return movement of the member 13, other suitable spring means may obviously be adopted if required. It is clear however that with the present U-shaped needle support it is not necessary to provide such spring means on both sides of the winding reel because the movements of the reel sides are precisely synchronized together.

By virtue of the invention a very compact retraction arrangement is provided and inertia sensing means at one side of the retractor is able to provide precisely synchronized programmed engagement of locking teeth on both sides of the retractor reel. Furthermore, because the centre of the rocking motion of the member 13 is at a distance from the centre axis of the reel which is appreciably greater than the radius of the periphery of the locking teeth 20, 21, a near instantaneous meshing of a large number of teeth 36, 37 of the frame is effected and the effectiveness and durability of the retractor may thereby be much enhanced.

We claim:

1. An automatic safety belt webbing retractor mechanism having a webbing reel (15) rotatable around the reel axle (14) for winding and unwinding a safety belt and biassed by a spring (17) said webbing reel being rotably moveably in a frame having two parallel side parts (22,23), locking teeth peripheries (20,21) provided at both ends of the webbing reel, said teeth being cooperable with teeth (36,37) disposed on the frame parts, an inertia device sensitive to exceeded vehicle deceleration or vehicle acceleration and/or accelerated belt movements for mechanical locking of the webbing reel (15) said webbing reel being supported so as to be able to make rocking movement between an operation position in which said webbing reel is freely rotatable and a locking position in which the teeth are engaged said inertia device comprising a toothed wheel (8) mechanically rotatable with the reel (15) and carried by a member (13) which carries one end of the reel axis pawl means (6 or 10) acting between said wheel (8) and said member (13) said member being rockable about a pivot under the effect of belt tension when such pawl means (6,10) are engaged to effect engagement of the teeth (20,21,36,37) for locking the reel characterised in that the distance of the axis of the pivot 45 of the member (13) from the axis of the reel is greater than the radius of the toothed peripheries of the reel and that means (14,26,31) are provided operable to synchronise engagement of the locking teeth (20,21;36,32) on each side of the reel (15).

2. A retractor mechanism as claimed in claim 1, characterised in that said means (14,26,31) to synchronise engagement of the locking teeth comprises a needle (14) one end of which is fixed to said member (13) against relative rotation and the needle (14) having at the other end a radially extending part (31) and a part 26 located in the frame for identical rocking motion with said member (13).

3. A retractor mechanism as claimed in claim 2 characterised in that said part (26) is also fixed to said member (13) against relative rotation.

4. A retractor mechanism as claimed in claim 3 wherein said part 26 comprising a needle part which extends between said radially extending part (31) and said member 13.

5. A retraction mechanism as claimed in claim 2 wherein said needle (14) being part of a "U" shaped needle (14,31,26; 14,31,51).

6. A retractor mechanism as claimed in claim 1 characterised in that the needle (14) has means (18) for engaging a coil spring centre for applying tension to a webbing on the reel (15).

7. A retractor mechanism as claimed in any claims 1 to 6 characterised in that said member (13) carries the means (5,6,7) for sensing vehicle decelerations or acceleration.

8. A retractor as claimed in claim 1 characterised in that said member (13) external teeth engageable by a pawl (10) of the inertia means responsive to excessive reel acceleration and said wheel (8) has external teeth (30) engageable by a pawl (6) of the inertia means responsive to excessive vehicle deceleration.

9. A retractor as claimed in claim 8 characterised in that said inertia means responsive to excessive vehicle decleration comprises a relatively heavy ball (7) and a pawl member (6) with a cup-shaped surface which sets directly on said ball member, said pawl being moved into engagement with said external teeth (30) by movement of the ball out of said cup-shaped surface.

* * * * *